United States Patent
Šulc

(10) Patent No.: US 7,167,111 B2
(45) Date of Patent: Jan. 23, 2007

(54) METHOD OF CODING AND/OR DECODING BINARY DATA FOR WIRELESS TRANSMISSION, PARTICULARLY FOR RADIO TRANSMITTED DATA, AND EQUIPMENT FOR IMPLEMENTING THIS METHOD

(75) Inventor: Vladimir Šulc, Sobotka (CZ)

(73) Assignee: Microrisc s.r.o. (CZ)

( * ) Notice: Subject to any disclaimer, the term of this patent is extended or adjusted under 35 U.S.C. 154(b) by 0 days.

(21) Appl. No.: 11/280,386

(22) Filed: Nov. 17, 2005

(65) Prior Publication Data

US 2006/0125662 A1    Jun. 15, 2006

(30) Foreign Application Priority Data

Nov. 22, 2004  (CZ) ................................. 2004-1134

(51) Int. Cl.
*H03M 5/00* (2006.01)
(52) U.S. Cl. .......................................... 341/58; 341/59
(58) Field of Classification Search ............. 341/50–80
See application file for complete search history.

(56) References Cited

U.S. PATENT DOCUMENTS 3,405,235 A    10/1968   Carter (Continued)

*Primary Examiner*—Rexford Barnie
*Assistant Examiner*—Lam T. Mai
(74) *Attorney, Agent, or Firm*—Buchanan, Ingersoll & Rooney PC

(57) ABSTRACT

The invention filed involves a method of coding and/or decoding binary data for wireless transmission, particularly for radio transmitted data. A sequence of binary data, introduced at the entry to the coding machine with a class N coder (KOD) comprising a register (REG), a comparator (COMP) and a counter (CITN), where N is a number greater than or equal to 3, is separated into a sequence of binary data of the same value, so that the length of each such sequence is not less than one and not more than N, and so that the binary values of the data introduced at the entry to the coder (KOD) are compared with the value last received and recorded in it, the lengths of the same sequences at this entry are read up to the number N and, after reading to N, a sequence of binary data of a value opposite to the value at the entry to the coder (KOD) is inserted, this inserted data sequence having a length M, where M is a number greater than or equal to one and less than N. At the same time the value recorded in the register (REG) is inverted and the length of the inserted sequence M is entered into the counter, while with each change in the register (REG) of the recorded value of the last bit received, registration of the length of the data sequence from the counter (CITN) to the buffer (BUF) is initiated, whereupon the lengths of the sequences of binary data are interpreted as binary impulses of length $X_1$, $X_2 \ldots X_N$, where $X_1$ to $X_N$ are time constants of mutually different values, assigned to various lengths of sequences of the same binary data. Where length M of a sequence of data entered is greater than one, binary control data can be inserted directly into the sequence of data as a sequence of data of length N, followed by a sequence of data of length L, where L is greater than one and less than M. At the entry to the coding or decoding machine, data can also be sensed to detect the start of their transmission whereupon, after detection, the frequency of the transmitting and receiving equipment is synchronized by insertion, transmission and reception of a control sequence. The subject of the invention is also a method of decoding data encoded according to the procedure described above. In decoding, the time lengths of the received impulses are first of all converted into sequences of the same binary data and then the inserted sequences of length M and the inserted control commands, as the case may be, are removed from these sequences.

6 Claims, 1 Drawing Sheet

U.S. PATENT DOCUMENTS

| | | |
|---|---|---|
| 4,523,181 A | 6/1985 | Tazaki et al. |
| 5,022,051 A | 6/1991 | Crandall et al. |
| 5,986,594 A * | 11/1999 | Nakayama et al. ......... 341/107 |
| 6,509,849 B1 | 1/2003 | von Wendorff |
| 6,956,510 B1 * | 10/2005 | He et al. ...................... 341/58 |
| 6,995,694 B1 * | 2/2006 | He et al. ...................... 341/58 |

* cited by examiner

METHOD OF CODING AND/OR DECODING BINARY DATA FOR WIRELESS TRANSMISSION, PARTICULARLY FOR RADIO TRANSMITTED DATA, AND EQUIPMENT FOR IMPLEMENTING THIS METHOD

FIELD OF THE INVENTION

The invention filed involves a method of coding and/or decoding data for wireless transmission, particularly for radio transmitted data, and equipment for implementing this method.

DESCRIPTION OF THE PRIOR ART

The transmission of data by means of wireless technology is based on the serial transmission of binary data, that is to say, as sequences of the binary values 0 and 1. Data transmitted by wireless technology are either sent unmodified, as for example in the case of direct copying of data from a serial line to a wireless transmission channel or, more often, as modified (coded) data where, in order to improve the transmission, they are modified (coded) before sending and then decoded at the receiving end.

At the present time, in order to modify data before sending by a wireless channel, Manchester, NRZ, 12b or Miller coding is used, for example. The reason for encoding data before sending by wireless channel is to improve the transmission properties of the channel meaning, for example, to increase its resistance to interference and to eliminate static elements for the possible addition of band pass filters and for better synchronization. A disadvantage of most of these methods of encoding is the reduction in transmission channel capacity.

SUMMARY OF THE INVENTION

The subject of this invention is a method of coding and/or decoding binary data for wireless transmission, particularly for radio transmitted data. The basis of the invention lies in the fact that a sequence of binary data, introduced at the entry to the coding machine with a class N coder comprising a register, a comparator and a counter, where N is a number greater than or equal to 3, is separated into a sequence of binary data of the same value, so that the length of each such sequence is not less than one and not more than N, and so that the binary values of the data introduced at the entry to the coder are compared with the value last received and recorded in it, the lengths of the same sequences at this entry are read up to the number N and, after reading to N, a sequence of binary data of a value opposite to the value at the entry to the coder is inserted, this inserted data sequence having a length M, where M is a number greater than or equal to one and less than N, at the same time the value recorded in the register is inverted and the length of the inserted sequence M is entered into the counter, while with each change in the register of the recorded value of the last bit received, registration of the length of the data sequence from the counter to the buffer is initiated, whereupon the lengths of the sequences of binary data are interpreted as binary impulses of length $X_1, X_2 \ldots X_N$, where $X_1$ to $X_N$ are time constants of mutually different values, assigned to various lengths of sequences of the same binary data.

The advantages of this method of coding and/or decoding of binary data according to the invention submitted and of an appropriate choice of time constants are, in particular, an improvement in the transmission properties of the wireless channel by elimination of static elements in the data transmitted and also an increase in transmission channel capacity.

Where length M of a sequence of data inserted is greater than one, binary control data can be inserted directly into the sequence of data as a sequence of binary data of the value of length N, followed by a sequence of data of the opposite binary value of length L, where L is greater than one and less than M. The actual insertion can be carried out by entering the numbers N and L into the buffer one after the other. By entering the control features it is possible to transmit various commands, for example, in the data flow.

At the entry to the coding or decoding machine, data can also be sensed to detect the start of their transmission whereupon, after detection, the receiving equipment is activated and the frequency of the transmitting and receiving equipment is synchronized. A circuit for detecting the start of transmission is connected at the entry to the coder. After detecting data at this entry to the coder, the circuit first inserts into the buffer the control sequence, which is then interpreted by the interpreter as a sequence of impulses of defined length, which serves to activate the receiving equipment and to synchronize the frequency of the transmitting and receiving equipment. This can be used advantageously, for example, for initialization of entry filters or for adaptive synchronizing of the frequency of data transmission and reception.

The subject of this invention is also a method of decoding data encoded according to the procedure described above. In decoding, the time lengths of the received impulses are first of all converted into sequences of the same binary data and then the inserted sequences of length M and the inserted control commands, as the case may be, are removed from these sequences.

The subject of this invention is furthermore equipment for implementing said method of coding and/or decoding of binary data, which comprises a coder block including a mutually connected register, comparator and counter blocks, where a block interpreter is connected to the coder. This configuration is advantageous where the data at the entry can be synchronized with the interpreter, which is possible for example if the data to be transmitted have already been prepared, for example entered in the buffer, or in the case where treatment of the binary data by the coder is faster than the minimal time constant of the interpreter. The method of execution without buffer, however, generally does not permit a further increase in the efficiency of the transmission channel by the simultaneous operation of the interpreter and the coder, since these blocks must be mutually synchronized. Alternatively, a buffer block can be connected between the coder and interpreter blocks.

BRIEF DESCRIPTION OF THE DRAWINGS

The attached

FIG. 1 is a block diagram of the coding machine with the coder, data buffer and interpreter.

FIG. 2 shows an example of an embodiment of the coding machine for use with a FIFO-type data buffer, with indication of synchronisation. When the length of the data sequence is 1, 2 or 3 bits, the relevant bit, B0, B1 or B2 is set out. By this method a clear interpretation is possible of the required time constant of the bistable flip-flop circuit, for example by switching the resistor of the RC member of the bistable flip-flop circuit.

FIG. 3 is an illustration of a coded sequence of the binary data "110010111110".

EXAMPLES OF THE PREFERRED EMBODIMENTS

Figure 1:
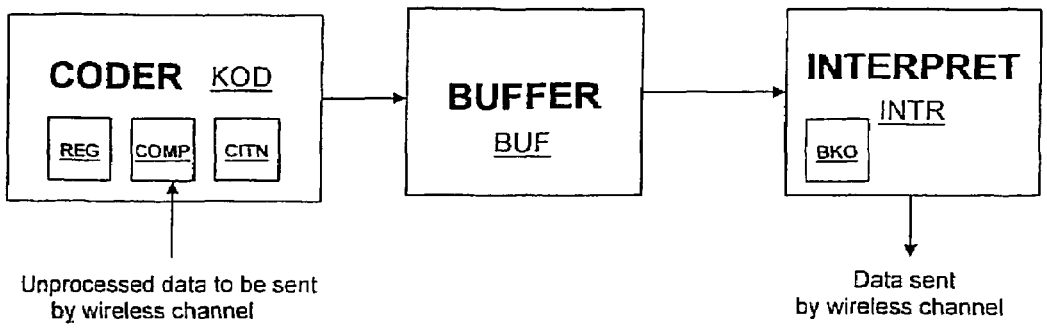
FIGS. 1 to 3 illustrate examples of embodiments of this invention, which is later described in more detail.

The sequence of binary data introduced at the entry to the coding machine is first of all separated by means of a coder KOD of the defined class N, where N is a number greater than or equal to 3, into a sequence of binary data of the same value so that the length of each such sequence is at least one and at most N (for example, for N=3 it will involve the binary sequence "0", "00", "000", "1", "11", "111"). After this sequence, if it is not the last one, a sequence of binary data of the opposite binary value will follow. This is achieved in the following way. The coder KOD comprises a comparator COMP, which compares the binary value at the entry to the coder KOD with the value last received and recorded in the register REG in this coder block, and a counter CITN to N (which is also part of the coder KOD), which reads the lengths of the same sequences at the entry to the coder KOD. After reading by the counter CITN (that is reading to N) the coder KOD effects the insertion of a sequence of binary data of a value opposite to the value at its entry. This inserted sequence has a length M, where M is a number greater than or equal to one and less than N. At the same time the register REG is thereby inverted and finally sets the counter CITN at M. Each change in the register REG, in which the value of the last received bit is recorded, initiates the registration of the length of the sequence (from the entry to the counter CITN) to the buffer BUF. The data, that is the lengths of the binary sequences, are taken from the buffer BUF by the interpreter INTR unit and interpreted as binary impulses of length $X_1, X_2 \ldots$ to $X_N$, where $X_1$ to $X_N$ are time constants assigned according to the length of the sequence. Because the data must be clearly decoded at the receiving end, it is obvious that none of the time constants can be equal. In practice it can be advantageous to chronologically set the lengths of the time constants as directly proportional lengths, for example, so that the interpreter INTR contains a bistable flip-flop circuit whose time constant for a newly generated impulse is given as $X_1 + K_i * i$, where $K_i$ is a constant generally considerably smaller than $X_1$ and i is the interpreted length of the sequence. By this method of coding and by an appropriate choice of time constants an adjustment (encoding) of the transmitted data is achieved which not only improves the transmission properties of the wireless channel by eliminating static elements but at the same time increases the capacity of the wireless channel relative to the method of coding used. A block diagram of the coding machine is shown in FIG. 1, an example of encoding, the increase in the transmission channel capacity and the elimination of static elements are clear from FIGS. 2 and 3.

Alternatively, the interpreter INTR in the coding machine according to this invention can be connected directly to the coder KOD, which can advantageously be used in the case where data at the entry can be synchronized with the interpreter INTR. That is possible, for instance, where the data to be transmitted are already "previously prepared", for example recorded in the buffer BUF before the coder, or in the case where the processing of the binary data by the coder KOD is faster than the length of the minimum time constant $X_{min}$ of the interpreter. The method of execution without the buffer BUF however generally does not permit a further increase in the efficiency of the transmission channel by the simultaneous operation of the interpreter and the coder, since these blocks must be synchronized.

The invention filed also involves the situation where the length M of the sequence of binary data inserted after overflow of the counter CITN is greater than one. Because, given the method of encoding, an opposite sequence of a length less than M cannot follow after a binary sequence of data of the values of length N, insertion of binary control data directly into the sequence can advantageously be used so that a binary sequence of length N is inserted followed by a sequence of length L, where L is greater than one and less than M. By inserting control characters it is possible to transmit commands, for example, in the flow of data. For example for N=3 and M=2, two possible commands can be inserted into the sequence of binary data, that is "0001" (followed by "0") or "1110" (followed by "1"). The transmitter can use these commands, for example in the case where he wants to maintain the connection with the receiver, but at the same time does not want the receiver to decode that data as regular data. A further possible use, for example, is for various cryptographic procedures.

Figure 2:
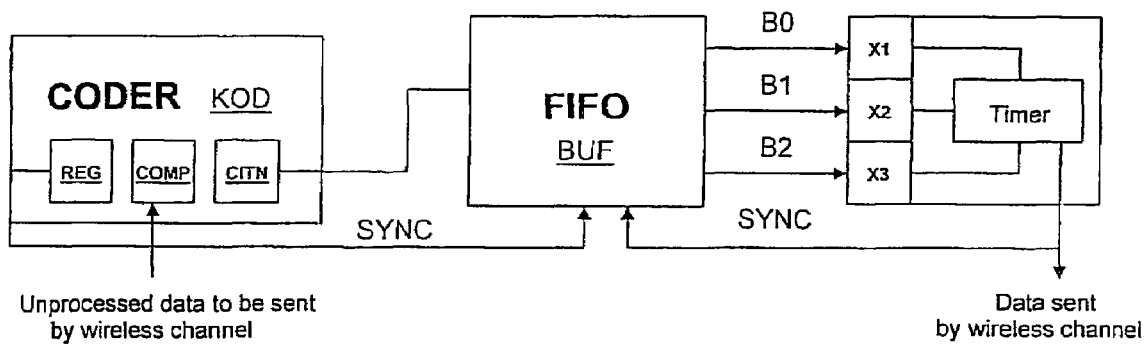
Figure 3:
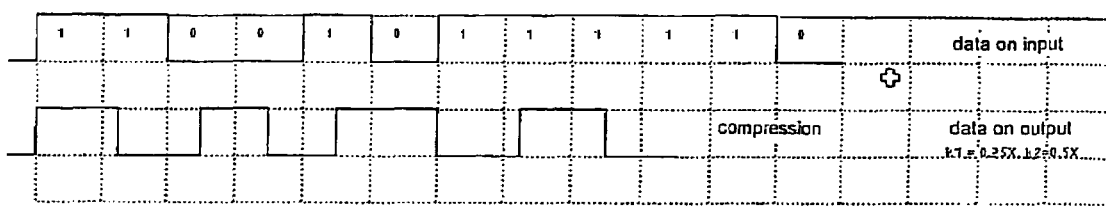

At the entry to the coding or decoding machine data can also be sensed to detect the start of their transmission whereupon, after detection, the receiving equipment is activated and the frequency of the transmitting and receiving equipment is synchronized (see FIG. 2). In such a case, a circuit for detecting the start of transmission is connected at the entry to the coder KOD. After detecting data at this entry to the coder KOD, the circuit first inserts into the buffer BUF the control sequence, which is then interpreted by the interpreter INTR as a sequence of impulses of defined length, which serves to activate the receiving equipment and to synchronize the frequency of the transmitting and receiving equipment. This can be used advantageously, for example, for initialization of entry filters or for adaptive synchronizing of the frequency of data transmission and reception.

By an appropriate choice of the parameters N (maximum length of a sequence of data of the same binary value), of the time constants $X_i$ and of the length of the sequence M inserted after overflow of the counter CITN, it is possible to adjust the system to the specific application and its requirements. For example, if there is a need to increase the transmission channel capacity, a larger N is used, if there is a need for high selectivity of the transmission channel, on the other hand, the setting N=3, M=2, $X_2 = X_1 + K_i$ and $X_3 = X_{-1} + K_i * 2$ is used, for example, where the $K_i$ selected is as small as possible so as to be distinguishable and processable by the specific system. During practical implementation of the coding machine according to this invention, an improvement for $K_i = X_1/4$ was used and checked out in practice. The results corresponding to the demonstrational data are clear from FIG. 3, in which the original data (serial stream) are recorded and the corresponding data encoded.

An example of a specific embodiment, where a bistable flip-flop circuit with adjustable impulse length is used as interpreter INTR, is shown in FIG. 2. The simplest embodiment of the invention described involves the use of single-chip microprocessors. For example, at the present time the smallest in the series of processors by the firm Microchip Inc., PIC10F200, offers sufficient HW equipment to produce the whole coding machine for negligible implementation costs (USD 0.35). By using the interior oscillator of said processor, it is possible to produce a coding machine by using the HW of the processor alone, without any need for further external components.

The decoding machine works in reverse with respect to the coding machine described, that is, first of all it converts the time lengths of the received impulses into sequences of binary data, from these sequences it removes the inserted sequences of length M and the inserted control commands as the case may be, and the resultant sequences are made available at its entry for further processing.

INDUSTRIAL USES

The invention can be used, for example, in home and office automation involving the setting, control and collection of data from heating systems, the operation and locking of the connectivity of safety systems, of air-conditioning, lighting, domestic appliances such as fridges, washing-machines, audio-visual systems and the like. It can be used also in industrial applications with wireless transmission of data.

Equipment for implementing the method of coding and/or decoding of binary data according to this invention comprises a coder (KOD) block including mutually connected register (REG), comparator (COMP) and counter (CITN) blocks, where a block interpreter (INTR) is connected to the coder (KOD). A buffer block (BUF) can be connected between the coder (KOD) and interpreter (INTR) blocks.

The invention claimed is:

1. A method of coding and/or decoding binary data for wireless transmission, particularly for radio transmitted data, characterised in that a sequence of binary data, introduced at the entry to the coding machine with a class N coder (KOD) comprising a register (REG), a comparator (COMP) and a counter (CITN), wherein N is a number greater than or equal to 3, is separated into a sequence of binary data of the same value, so that the length of each such sequence is not less than one and not more than N, and so that the binary values of the data introduced at the entry to the coder (KOD) are compared with the value last received and recorded in it, the lengths of the same sequences at this entry are read up to the number N and, after reading to N, a sequence of binary data of a value opposite to the value at the entry to the coder (KOD) is inserted, this inserted data sequence having a length M, where M is a number greater than or equal to one and less than N, at the same time the value recorded in the register (REG) is inverted and the length of the inserted sequence M is entered into the counter, while with each change in the register (REG) of the recorded value of the last bit received, registration of the length of the data sequence from the counter (CITN) to the buffer (BUF) is initiated, wherein the lengths of the sequences of binary data are interpreted as binary impulses of length $X_1, X_2 \ldots X_N$, wherein $X_1$ to $X_N$ are time constants of mutually different values, assigned to various lengths of sequences of the same binary data.

2. A method according to claim 1, wherein length M of a sequence of data entered is greater than one, binary control data are inserted directly into the sequence of data as a sequence of data of length N, followed by a sequence of data of length L, where L is greater than one and less than M.

3. A method according to claim 1, wherein at the entry to the coding or decoding machine, data are sensed to detect the start of their transmission whereupon, after detection, the frequency of the transmitting and receiving equipment is synchronized by insertion, transmission and reception of a control sequence.

4. A method of decoding data encoded according to claim 1, wherein in decoding, the time lengths of the received impulses are first of all converted into sequences of the same binary data and then the inserted sequences of length M and the inserted control commands, as the case may be, are removed from these sequences.

5. Equipment for implementing the method of coding and/or decoding of binary data according to claim 1, wherein it comprises a coder (KOD) block including mutually connected register (REG), comparator (COMP) and counter (CITN) blocks, where a block interpreter (INTR) is connected to the coder (KOD).

6. Equipment according to claim 5, wherein a buffer block (BUF) is connected between the coder (KOD) and interpreter (INTR) blocks.

* * * * *